SUSUMU NISHIGAKI
KAZUO KOBAYASHI
MAKOTO NODA &
TAKESHI KAJITA

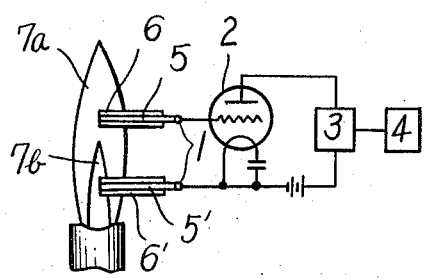
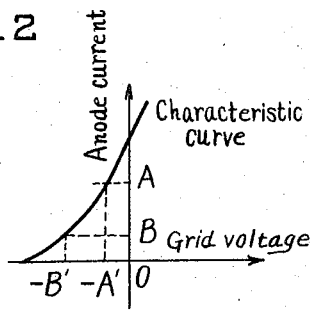
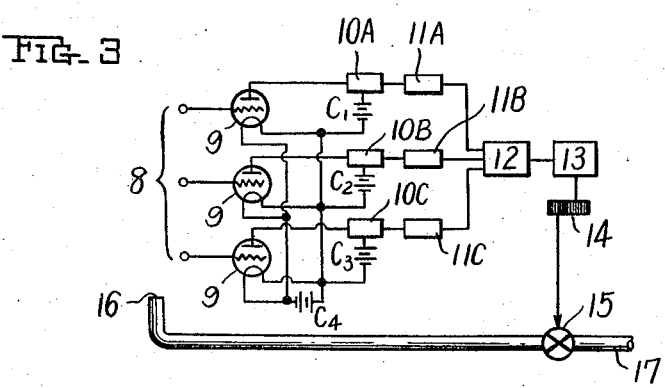
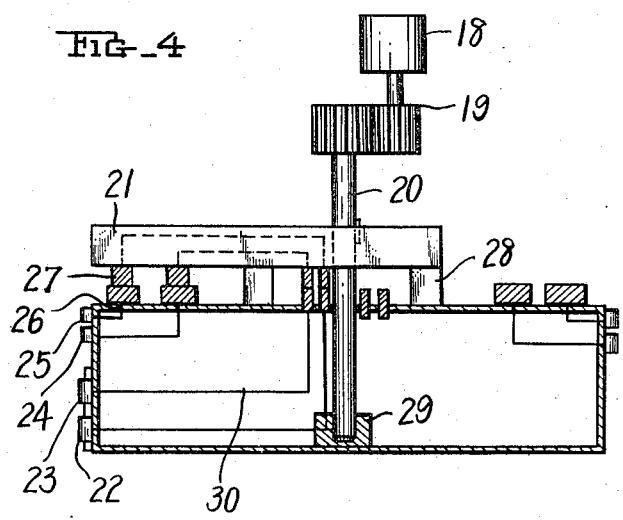

Jan. 31, 1967  SUSUMU NISHIGAKI ETAL  3,301,307
DEVICE FOR DETECTING THE CONFIGURATION OF A BURNING FLAME
Filed Aug. 24, 1964  5 Sheets-Sheet 4

SUSUMU NISHIGAKI
KAZUO KOBAYASHI
MAKOTO NODA &
TAKESHI KAJITA
INVENTORS

BY Stevens, Davis, Miller & Mosher
ATTORNEYS

United States Patent Office 3,301,307
Patented Jan. 31, 1967

3,301,307
DEVICE FOR DETECTING THE CONFIGURATION
OF A BURNING FLAME
Susumu Nishigaki, Kazuo Kobayashi, and Makoto Noda, Nagoya, and Takeshi Kajita, Ama-gun, Japan, assignors to NGK Insulators, Ltd., Mizuho-ku, Nagoya, Japan, a corporation of Japan
Filed Aug. 24, 1964, Ser. No. 391,531
Claims priority, application Japan, Aug. 29, 1963, 38/45,935; Nov. 12, 1963, 38/60,578; Nov. 20, 1963, 38/62,254, 38/62,255; Jan. 18, 1964, 39/1,999; Feb. 5, 1964, 39/5,645
6 Claims. (Cl. 158—28)

Gaseous fuels such as city gas, propane, hydrogen, acetylene, etc., and liquid fuels such as petroleum, light oil, gasoline, etc. have been widely used in various heat sources such as room heaters, burners, industrial furnaces, and careful attention has been paid to accidents due to non-flaming ejection of such fuels.

This invention relates to a method of safety control of flames and more particularly to a device for detecting non-flaming fuel ejection instantly, simultaneously actuating an alarm and transmitting an electrical signal to fuel control systems ordering the switching of fuel control valves to insure safety of the burner and furnace as well as the safety of operating personnel. Thus, an object of the present invention is the complete elimination of accidents due to non-flaming fuel ejection.

The principal object of the invention is to detect configurations of burning flames. To prevent flames from being blown out and to measure flame temperature, bimetal thermo-couples and photo-cells have been conventionally used but they are not effective in detecting a flame configuration, and such detection of flame configurations has been done only by one's eye. The need for detection of a flame configuration, however, has been increasing in recent years, for instance.

(1) In the furnace of baking ceramic articles, the flame distribution greatly influences quality of the product, and (2) Similar influence with the above item 1 is noticed in the heat treatment of metals, wherein the detection of flame configurations will contribute to improve atmospheric control.

Another object of the invention is to provide a device to detect flame configurations and to operate burners under the most favorable condition.

The conventional methods of detecting said non-flaming conditions are to sense the temperature of flames by using bimetals, thermocouples and photocells. The operating characteristics of such methods include an undesirable time delay inevitable with temperature sensing using bimetals or thermocouples. There is a possibility of inaccuracy in the case of photocells due to reflection from the walls surrounding the flames to be detected. They are also expensive to manufacture.

The invention provides a means which enables detection of flame configurations with a substantially negligible time delay compared with conventional means and detection of a nonflaming condition instantly to prevent physical hazards to operators and other accidents such as gas toxication.

A further object of the invention is to eliminate said hazards and accidents completely by providing a detecting device which is very sensitive and effective in instantaneous detection of nonflaming ejection, in actuating an alarm and transmitting electrical signals to fuel valve and cock systems, in ordering the switching operation of said valves, and in insuring the safety of operators, burners and furnaces.

According to the invention inexpensive and positively operating alarm devices can be obtained and also a plurality of burners can be controlled as a unit.

The principle of the invention is based on, first of all, the recognition of the phenomenon that a negative potential to ground is produced in an electric conductor when it is located in a burning flame. It seems that such a phenomenon is due to an exchange of electric charges between the conductor acting as an electrode and ionized molecules through the contact surface of said electrode with the flame depending upon differences of temperature and degree of combustion between the inner and outer parts of said burning flame and atmospheric conditions. The phenomenon is inherent to flames and a potential difference in the order of 2–10 volts or more has been obtained by experiments.

For a better understanding of the invention reference is taken to the accompanying drawings, in which, FIG. 1 is a circuit diagram illustrating the principle of the invention;

FIG. 2 is a characteristic curve for illustrating the relation between the grid potential and anode current caused in case of FIG. 1;

FIG. 3 is a circuit diagram illustrating an embodiment of the invention;

FIGS. 4 and 5 are a sectional elevation and a sectional plan view respectively of a gang-operated multicontact switch embodying the invention;

Figure 5:
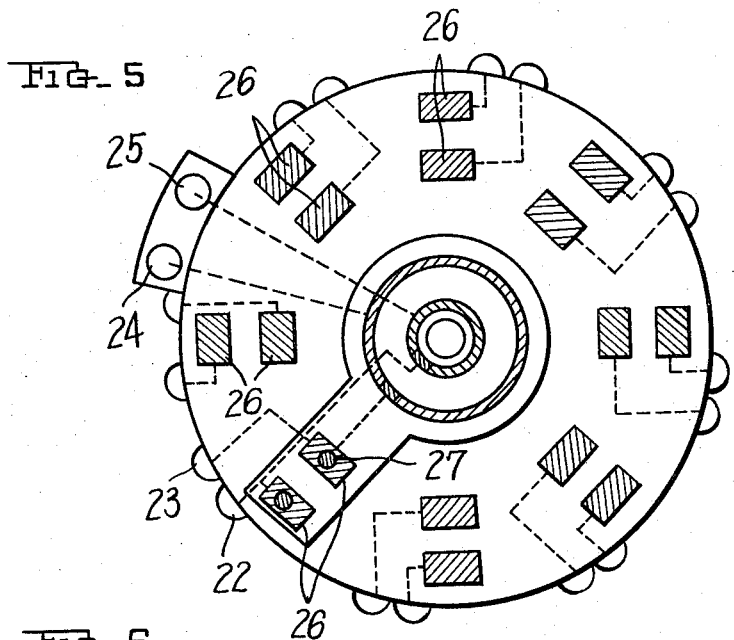

Referring to FIG. 1, two wire shaped electrodes 5 and 5' protected with heat resistant insulator tubes 6 and 6' respectively leaving each tip of the electrodes exposed are inserted into a burning flame at 7a and 7b, 7a being positioned within the upper peripheral portion in said flame and 7b being positioned within the inner core of said flame.

The connection is made in the manner as shown in FIG. 1, where 1 indicates terminals to connect leads from said electrodes with a grid and a cathode respectively of a vacuum tube 2 which has a general characteristic like a triode but characterized by comparatively rapid decrease of the anode current to zero when the control grid voltage is biased. 3 is a relay and 4 is a relay-operated alarm device such as a buzzer or a lamp. Under such arrangement, there is a temperature difference between electrodes located in a flame due to temperature differences between an inner core and an upper portion of the flame, and the collision of ionized molecules of a flame with a hot surface of the electrode causes an electric charge to be exchanged between the hot electrode and the ionized molecules. This phenomenon is inherent to a flame, and in general, the potential of the low temperature side electrode placed in a flame against the high temperature side electrode is considered to have about the same potential with ground. In the circuit shown in FIG. 1 a negative bias can be applied to the control grid of a vacuum tube 2 to cause operation of a relay 3 by connecting the electrode on the high temperature side to the control grid without applying another electrical potential because a spontaneous negative potential is produced between the high temperature side electrode and ground, and thus the alarm device 4 can be operated.

In FIG. 2, A indicates the minimum anode current of a vacuum tube to energize a relay which when said anode current is larger than A can be energized continuously to operate the alarm. With anode current less than B the relay is not energized to operate the alarm and thus safety can be confirmed. —A' and —B' indicate grid bias voltages corresponding to anode currents A and B respectively. According to the invention, if the electrode which has a negative potential in a flame is connected to the grid of a vacuum tube and the characteristics of an amplifier are selected properly the voltage applied to the grid can be kept below —B' as long as the flame temperature is within a predetermined range, so that the alarm is not operated and safety may be recognized.

The characteristic feature of the method of the invention lies in the fact that the voltage difference disappears and an alarm device is operated, thereby preventing dangers due to the failure of combustion. Vacuum tubes having a high dynamic anode resistance have been developed recently, and the object of the invention can be well attained by using such vacuum tubes. Another possibility is to use a transistor for amplifying a very low signal voltage to operate a relay and an alarm device to prevent the danger.

FIG. 3 illustrates an embodiment of the invention in which combustion is maintained at a desired constant condition by detecting the size of a flame. A plurality of electrodes 8 detect the position of the top of a flame and indicate said position as voltage signals, which are amplified by amplifiers 9 to energize relays 10A, 10B and 10C by the amplifier outputs and to operate alarm devices 11A, 11B and 11C, and the motor 13 is driven by outputs of the alarm devices by way of an alarm signal detector 12 that detects which alarm device is operated, and the opening of the gas supply valve 15 is controlled by the motor 13 through gearing 14, and thus the flame size of the burner 16 is controlled. Here 17 is an inlet opening for the fuel pipe.

As shown in the above example, the method of the invention enables arbitrary measurement, adjustment and control of the size of a flame located at a place where direct inspection is difficult and thus brings a large advantage to the industry.

A flame generally consists of an oxidizing flame and a reducing flame and the invention provides a method to detect the configuration of border lines between said two kinds of burning flames. A plurality of electrodes are suitably arranged or suitably moved in a flame to measure each position together with each voltage of the electrode. The voltages produced in the oxidizing flame and in the reducing flame are different from each other depending on the temperature difference in the surrounding atmospheres. By measuring said voltage difference beforehand, the observation of an oxidizing flame and a reducing flame during the operation of a burner is made possible.

Control of a plurality of flames by only one alarm device is also made possible by providing a switch at connecting points of leads from electrodes in individual flames and the alarm device and by switching over connections between electrodes and the alarm device in such a manner that only electrodes in one flame are connected to the alarm device at a time in turn. If the power is kept supplied to an alarm equipment or an alarm device such as a buzzer while said connections are being switched, there is a possibility of an alarm signal being produced during the shift from one electrode to the other, and hence said electrode switching must be accompanied by the simultaneous switching of the power supply to said alarm equipment or alarm device. Accordingly, combustion control of a plurality of flames located at different places by one alarm device can be made by placing a gang-operated multicontact switch having a number of switch contacts, one or a pair of which are placed between the power source and the alarm equipment or alarm device for switching power source leads to the alarm equipment or alarm device. The other contacts of said switch are placed between electrodes and the alarm equipment for switching the connection of electrode leads to the alarm equipment. Besides, by rotating this switch at a certain constant speed, simultaneous and automatic control of a plurality of flames located at different places is made possible.

FIGS 4 and 5 are illustrative diagrams of an example of said gang-operated multicontact switches, in which 18 is a motor, 19 is a set of reduction gears, 20 is a driving shaft, 21 is a contact plate keyed to the shaft 20. 22, 23, 24, 25 are contact terminals. 22 is a connecting terminal of a detecting electrode (22 and 25 are connecting terminals of an alarm device for a power source, 23 and 24 are connecting terminals of an alarm device for a detector, 26 is a fixed contact, 27 is a movable contact of said contact plate, 28 is a guide for supporting the rotation of a contact plate, 29 is a bearing, and 30 are connection leads.

Figure 6:
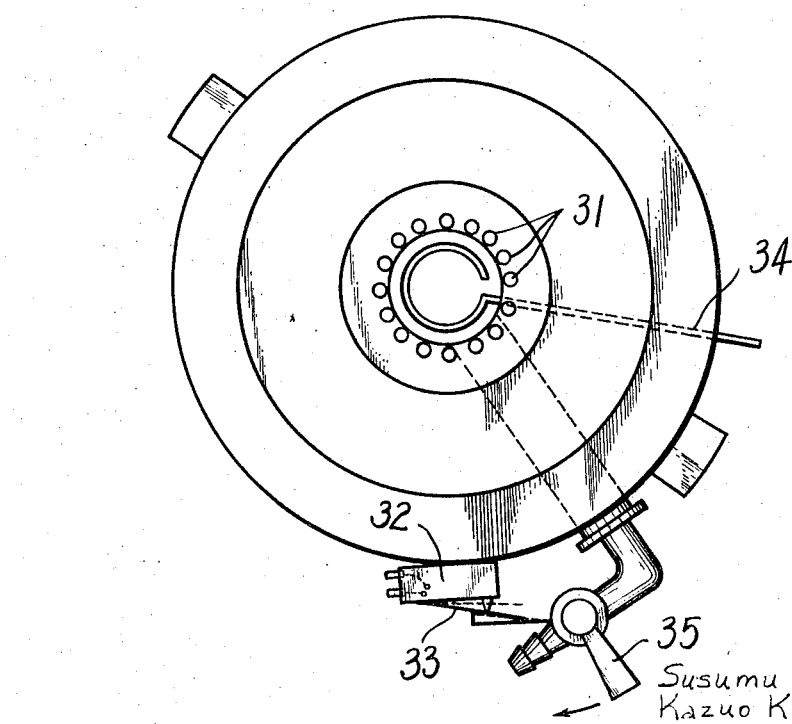
FIG. 6 is a diagrammatic plan view of an embodiment of the invention in which a gas cock is gang-operated with a power source switch to actuate alarm circuits.

The invention aims at improving safety by having a switching means of a fuel supply system interlocked with or included in power supply switches of the detecting equipment. An example of the invention including said improvement is explained referring to FIG. 6, in which 31 represents a gas burner, 32 a microswitch, 33 a lever for said microswitch, 34 a detecting electrode, 35 the handle of a gas cock. As the gas cock 35 is opened the microswitch 32 is held closed while as the gas cock 35 is closed the microswitch is opened. In this system, by adjusting the angle of the lever 33 the contact making point of the micro switch can be easily adjusted, and hence the microswitch can be actuated either instantly or a little before the opening of the cock. By using the microswitch in the power supply circuit to the detecting equipment, said microswitch in the power supply circuit to the detecting equipment can be gang-operated with the switching means of the fuel supply system, and thus the operation is greatly simplified resulting in the elimination of such human errors as forgetting to close the power supply switch.

Figure 7:
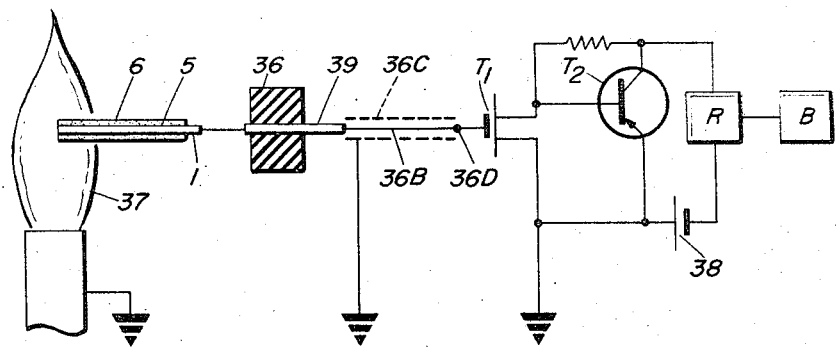
FIGS. 7, 8 and 9 are circuit diagrams illustrating several embodiments of the invention.

In the invention field effect transistors can be used in the detecting circuit. Referring to FIG. 7, an electrode 5 is projected with a heat resistant insulator tube 6 and has a tip exposed at one end of the tube 6 inserted into the burning flame 37. The electrode 5 has a terminal 1. The electrode 5 is made of a heat resisting metal, or a ceramic semiconductor, or a compound of metal and ceramic or other materials which produce a negative potential to ground when inserted into a flame as shown in the diagram. An electric insulator 36 serves for holding the electrode 5. An electrical input conductor 36B connects the electrode 36 to an input terminal 36D. An electrical shield 36C is connected to ground. The negative potential thus produced is fed by suitable leads to a gate of a field effect transistor $T_1$ as its input. The most salient feature in using field effect transistors is in fact that sufficiently high input resistance can be obtained by using field effect transistors, and an input resistance in the order of 10–1,000 megohms can be obtained with ease, which is comparable with that of a vacuum tube having a high input resistance. Judging from the fact that the internal resistance of a signal source from electrodes 36 inserted in a flame has high resistance values in the order of more than 10 megohms, application of said type transistors results in very high sensitivity enabling detection and control of a very weak and small flame.

Figure 8:
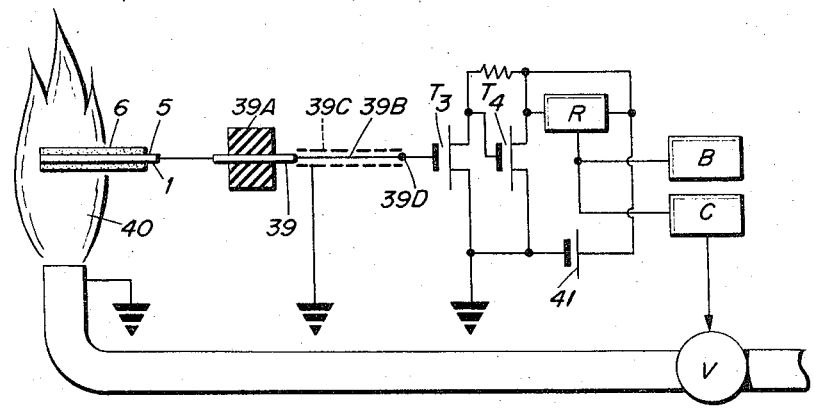

$T_2$ is a general purpose transistor to amplify the signal from $T_1$. R is a relay which actuates relay switches by the voltage variation of the detecting electrode in case of a blown out flame, or of a shortened flame breaking its contact with the detecting electrode, or of a blown away flame by the wind breaking its contact with the detecting electrode, and accordingly the alarm device B such as a buzzer or a red lamp is actuated. 38 is a source of electric power. A plurality of field effect transistors can be used, and FIG. 8 illustrates an example using two field effect transistors $T_3$ and $T_4$. R and B are a relay and an alarm device respectively as shown in FIG. 7. C is a device to control switching of a valve V by signals from said relay. In FIG. 8, reference numerals 6, 5, 1, 40 and 41 correspond to reference numerals 6, 5, 1, 37 and 38 respectively shown in FIG. 7. An electric insulator 39A serves for holding the electrode 39. An electrical input conductor 39B connects the electrode 39 to an input terminal 39D. An electrical shield 39C is connected to ground.

Figure 9:
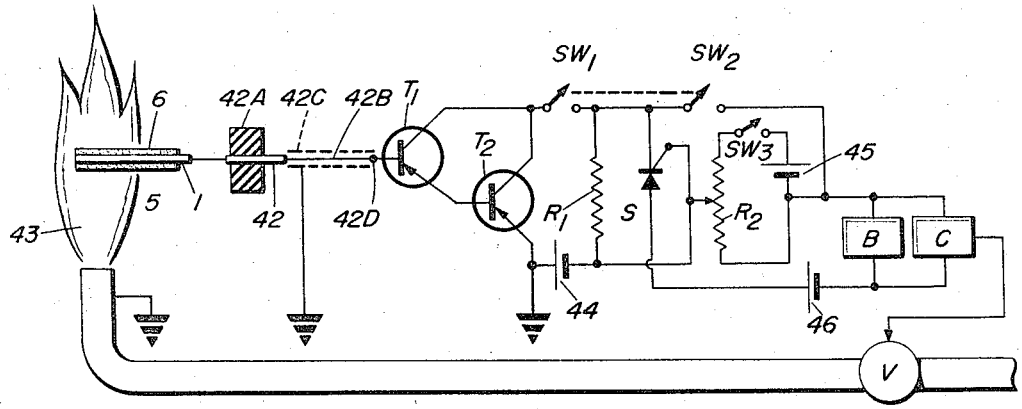

In the invention semi-conductor controlled rectifiers can be used in relay circuits. Referring to FIG. 9, 5 is an electrode consisting of a heat resistant metal or a ceramic semiconductor or a compound of metal and ceramic, etc., 6 is a heat resistant insulating tube, 1 is a terminal and 43 is a burning flame. An electric insulator 42A serves for holding the electrode 42. An electrical input conductor 42B connects the electrode 42 to an input terminal 42D. An electrical shield 42C is connected to ground. The electrode 42 produces a negative voltage to ground when inserted into a flame. The output of the detecting device is fed to the detector terminals of the transistors $T_1$ and $T_2$ as their input. The input signal is transferred to the resistor $R_1$ as the output variation of transistors $T_1$ and $T_2$. A voltage divided by the resistor $R_2$ is applied to output terminals of said transistor circuit with reversed polarities with suitable leads. At the same time, said voltage divided by the resistor $R_2$ is used to control the gate of the semiconductor controlled rectifier S. The anode and cathode of the semiconductor controlled rectifier S are connected to an alarm device B such as a red lamp and a buzzer by way of a separate battery. In FIG. 9, 44, 45 and 46 are power sources and $SW_1$ and $SW_2$ are gang-operated switches, $SW_3$ is a switch, C is an actuator and V is a valve. When the electrode 42 is inserted into a flame as shown in the diagram, the output voltage surpasses the voltage divided by the resistor $R_2$ and the semiconductor controlled rectifier is maintained at OFF state. When a flame is extinguished, the voltage divided by the resistor $R_2$ now surpasses the reduced output voltage and the semiconductor controlled rectifier quickly turns into ON state and the alarm device B is actuated. At the same time, the actuator C is energized to control the switching of the fuel supply valve V.

Figure 10:
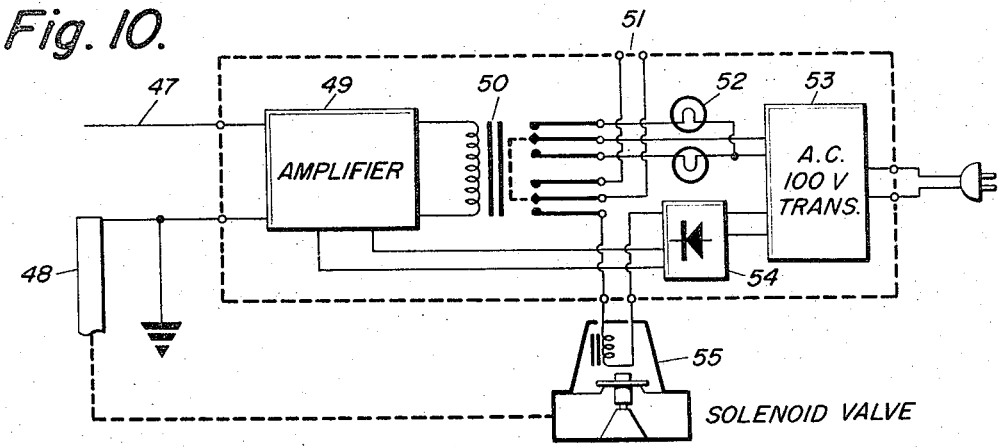
FIG. 10 is a block diagram of another embodiment of the invention.

Another example of the invention using safety equipment for automatic firing and valve switching control is illustrated by FIG. 10, where 47 is a conductor leading to an electrode as shown in FIG. 7, 48 is a burner, 49 is an amplifier consisting of said vacuum tubes or transistors or combination of them, 50 are relays, and 51 are terminals for automatic firing which are short circuited when the ejected fuel is not burning. Accordingly, if said automatic firing part is combined with an electrical firing circuit or with a firing circuit using piezoelectricity to form an automatic firing circuit, firing operation begins immediately after the fuel valve is opened to ignite fuel, and when the flame grows gradually until such magnitude that the flame touches the detecting electrode 47, the relay 50 is actuated according to the principles of the invention to open the terminals and the firing operation terminates automatically. Besides, 52 designates lamps, 53 is a power source circuit, 54 is a rectifying circuit to provide power to an amplifier and a magnetic valve 55.

As for the circuitry of the alarm device B, by gang-operating switches $SW_1$ and $SW_2$ to ON position after confirming existence of a flame and by turning $SW_3$ to ON position thereafter, alarm device B and actuator C are made ready for operation in case of an emergency such as a blown out flame. The advantage in using a semiconductor controlled rectifier in relay circuits is in the fact that the semiconductor controlled rectifiers have high reliability.

*Example 1*

Figure 11:
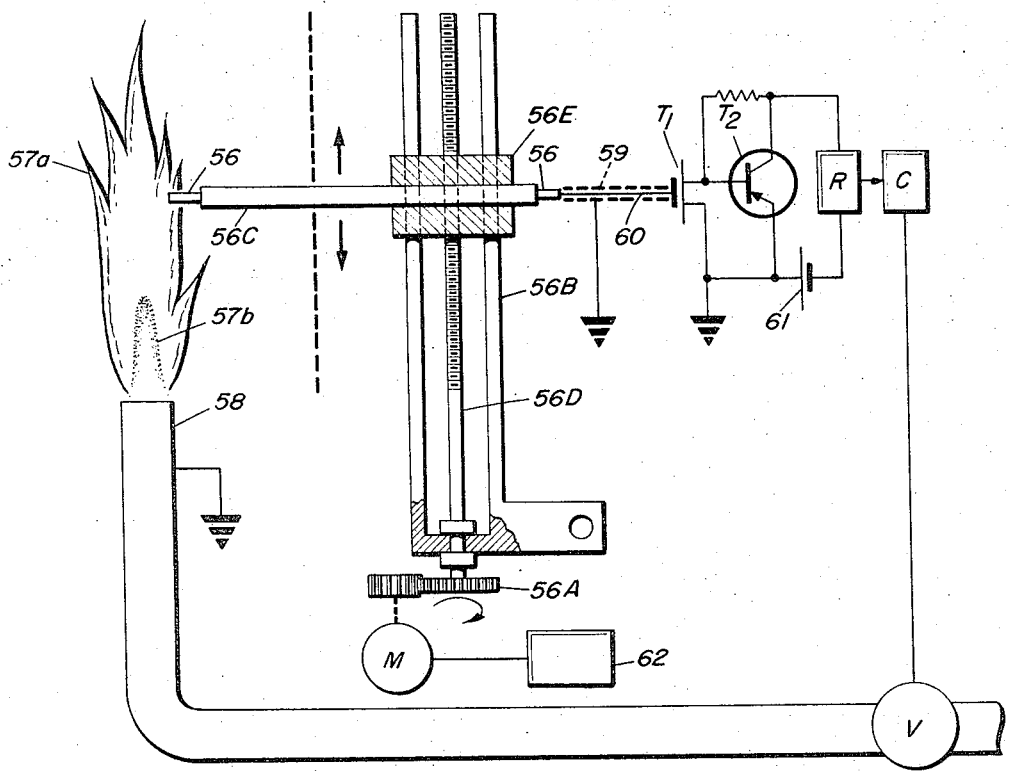
FIG. 11 is a diagrammatic view illustrating an embodiment of the invention for detecting the configuration of a flame.
Figure 12:
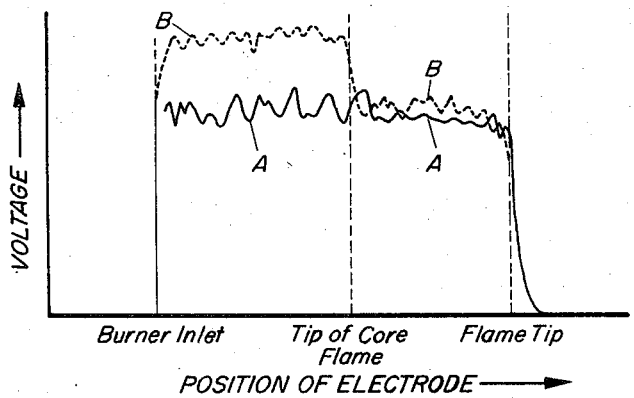
FIG. 12 is a graph illustrating voltage variations against the shift of electrode positions in the example shown in FIG. 11.

When a detecting electrode 56 in FIG. 11, consisting of a platinum electrode, was moved within the upper portion of a flame at the reciprocate vertical speeds of 0.5 cm./sec., 2 cm./sec. and 5 cm./sec., each movement of the electrode resulted in the same voltage distribution profile shown by the curve A in FIG. 12 (after amplification). The curve A illustrates the characteristic of an oxidizing flame only which lies in the upper portion of the original flame.

When the detecting electrode was moved in the central portion of the flame at the same speed with the above, each movement of the electrode resulted in the same voltage distribution profile shown by the curve B in FIG. 12 (after amplification). The curve B illustrates the characteristic of a reducing flame.

By combining the above two movements of an electrode the situation inside a flame was detected accurately. In FIG. 11, 56A is a gear gang-operated with a reversing motor to move the detecting electrode periodically, 56B is a transverse frame work for the electrode moving mechanism and 58 is a burner, 56 is an electrode covered by a protective tube 56C which passes through and is supported by a head 56E. 56D is a screw spindle to be turned by a handle 56A and engaging and penetrating the movable head 56E for adjusting its up-and-down positions. 56B represents supporting pillars of the head 56E. 57a is an oxidizing flame and 57b represents a reducing flame. 58 designates a burner. Shielded input cord 59 is the same as the shielded input cord 36C shown in FIG. 7. Electrical input conductor 60 is connected to the gate of a field effect transistor $T_1$. $T_2$ is a transistor. R is a relay circuit shown in FIG. 7. C illustrates a control device adapted to receive a signal from the relay circuit R and control the switching of valve V. A periodically reversing source of D.C. supply for the amplifier circuit is designated by 61, and 62 illustrates an electric supply source for a reversing motor M for operating the gear 56A. The periodically reversing source of D.C. supply 62 serves to supply electric power, having different polarities, to the reversing motor M when the head 56E moves along the screw spindle 56D and reaches each end thereof after a given interval of time. Thus, the gear 56A changes its rotating direction after the given interval of time so that the head 56E with the electrode 56 moves periodically up and down.

*Example 2*

Voltage distribution corresponding to a flame configuration was detected by moving an electrode, consisting of a complex of a heat resistant metal and a compound of metal and ceramic, in a flame at the speed of 1 cm./sec.

*Example 3*

In Example 1, the metallic electrode was replaced by a conductive ceramic (NiO—$Li_2O$) electrode and the amplifier gain is increased, and the same results with Example 1 were obtained.

*Example 4*

In Example 1, the metallic electrode was replaced with a thermistor (W—$Al_2O_3$) electrode, and the same results with Example 1 were obtained.

*Example 5*

The object of Example 1 was attained with regard to a oxyhydrogen flame by modifying the circuit of Example 1 suitable for insertion and detection in an oxyhydrogen flame with application of a certain quantity of conductive ceramic, which was a solid solution of yttria in zirconia, to the tip of said electrode.

Example 6

Figure 13:
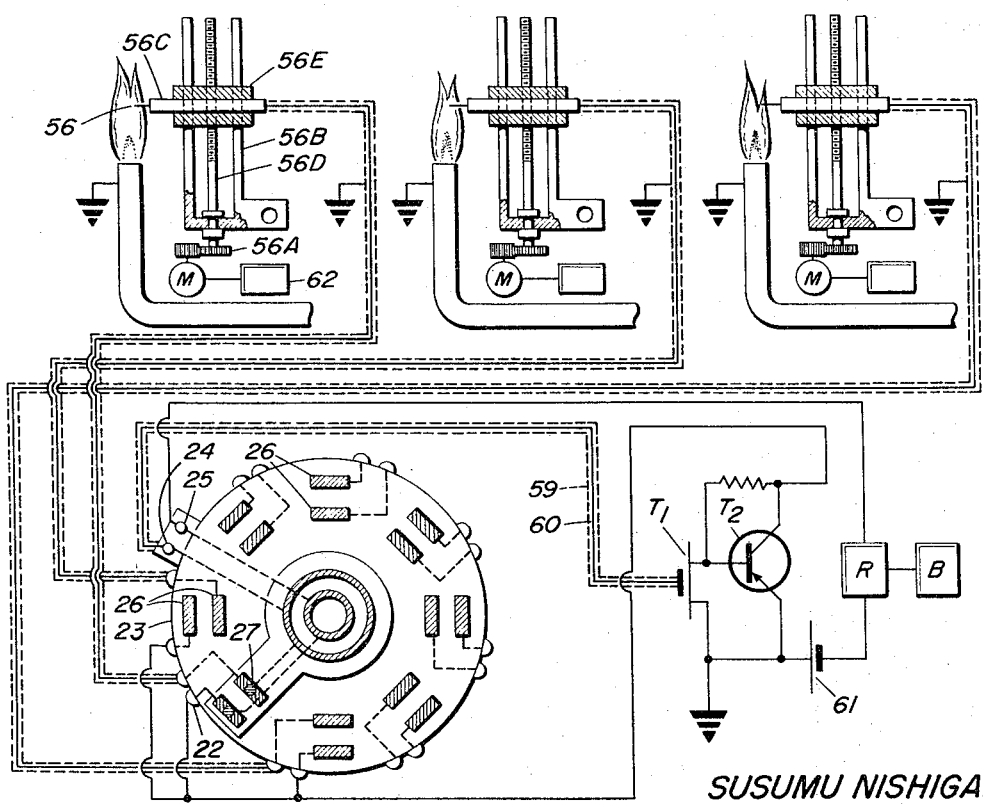
FIG. 13 is a diagrammatic view illustrating an embodiment of the invention.

In Example 1, only one electrode connected to the input terminal of the detecting equipment was used and the other terminal of the detecting equipment was grounded, and the same results with Example 1 were obtained. FIG. 13 shows another embodiment of the invention in which the switch shown in FIGS. 4 and 5 is combined with the device shown in FIG. 11. The same reference numerals designate the same parts throughout FIGS. 5, 11 and 13. The input signal from each burner is supplied through the switch to the amplifier where the input signal is detected. The input signal is switched at the same instant as on and off of the supply source 61 for the amplifier circuit, thus preventing delivery of an undesired alarm signal in the absence of the input signal during switching.

As the electrode material of the detecting equipment of the invention, any material having good heat resistance and good electric conductivity such as platinum, iron, silver, copper, beryllium, gold, molybdenum, nickel, chromium, tantalum, titanium, tungsten, zirconium, carbon, etc. can be used. Accordingly, one of the above metals or an alloy having one or more of the above metals as principal components can be used for an electrode.

The invention may be embodied in other specific forms without departing from the spirit or essential characteristics thereof. The present embodiments are therefore to be considered as illustrative and not restrictive, the scope of the invention being indicated by the appended claims rather than the foregoing description and all changes which come within the meaning and range of equivalency of the claims are therefore to be embraced therein.

What we claim is:

1. A device for detecting the configuration of burning flame which comprises at least one detecting electrode made of a heat resisting material selected from the group consisting of heat resistant metal, electrically conductive ceramic, a compound of metal and ceramic, and a combination of such materials, inserting at least a tip of said electrode into a burning gaseous flame issued from a burner using gaseous and liquid fuels, an amplifier connected to said electrode for amplifying the voltage difference detected between said detecting electrode and ground, an indicating device connected to be operated by the amplified voltage difference, a driving device for moving said electrode periodically in the flames to detect the configuration of flame and means operatively connected to said amplifier for analyzing and supervising said flame configuration.

2. A gang-operated multialarm device for detecting the blown off condition of burning flame and nonignition condition of gas according to claim 1, which comprises a detecting electrode in each of plurality of burning flames and change over switch devices for connecting said electrodes to an alarm device.

3. A device for detecting the configuration of a burning flame in a fuel burning unit which comprises at least one detecting electrode made of heat resisting material selected from the group consisting of a heat-resistant material, an electrically conductive ceramic, a compound of metal and ceramic, and a combination of such materials, at least a tip of said electrode being inserted into a burning flame, amplifier means operatively connected to amplify a negative potential produced between said detecting electrode and ground, and indicating device operatively connected to be actuated by the amplified voltage difference, a driving device for moving said electrode periodically into the flames to detect the configuration of the flame, and means for analyzing and supervising said flame configuration.

4. A device for indicating and controlling combustion in a fuel burning unit according to claim 3 wherein said indicating device includes an alarm means energized upon the extinction of said gaseous flame and upon failure of said gas to ignite.

5. A device for indicating and controlling combustion in a fuel burning unit according to claim 3 wherein said indicating device includes a control means controlling the degree of combustion and magnitude of flame by regulating the flow of fuel to a combustion chamber.

6. A device for indicating and controlling combustion in a fuel burning unit according to claim 3 wherein a detecting electrode is located in each of a plurality of burning flames for the purpose of detecting the extinction of a burning flame and nonignition condition of said fuel, and said electrodes being connected through a change-over switch to an alarm device.

References Cited by the Examiner

UNITED STATES PATENTS

| | | | |
|---|---|---|---|
| 2,304,200 | 12/1942 | Plein et al. | 158—28 |
| 2,361,294 | 10/1944 | Jones | 158—28 X |
| 2,374,610 | 4/1945 | MacLaren | 158—28 |
| 2,396,146 | 3/1946 | Atwater | 158—28 |
| 2,496,502 | 2/1950 | Steensma | 158—28 X |
| 2,715,815 | 8/1955 | Malick et al. | |
| 2,820,945 | 1/1958 | Marsden. | |
| 2,940,255 | 6/1960 | MacCraken | 158—28 X |
| 2,981,939 | 4/1961 | Carbauh. | |
| 3,002,550 | 10/1961 | Schreter | 158—28 |

JAMES W. WESTHAVER, *Primary Examiner.*